April 29, 1958 M. H. EMRICK 2,832,224

LEAD SCREW TAPPING UNIT

Filed Sept. 28, 1954 3 Sheets-Sheet 1

INVENTOR.
MELVIN H. EMRICK

BY Howard E. Thompson

ATTORNEY.

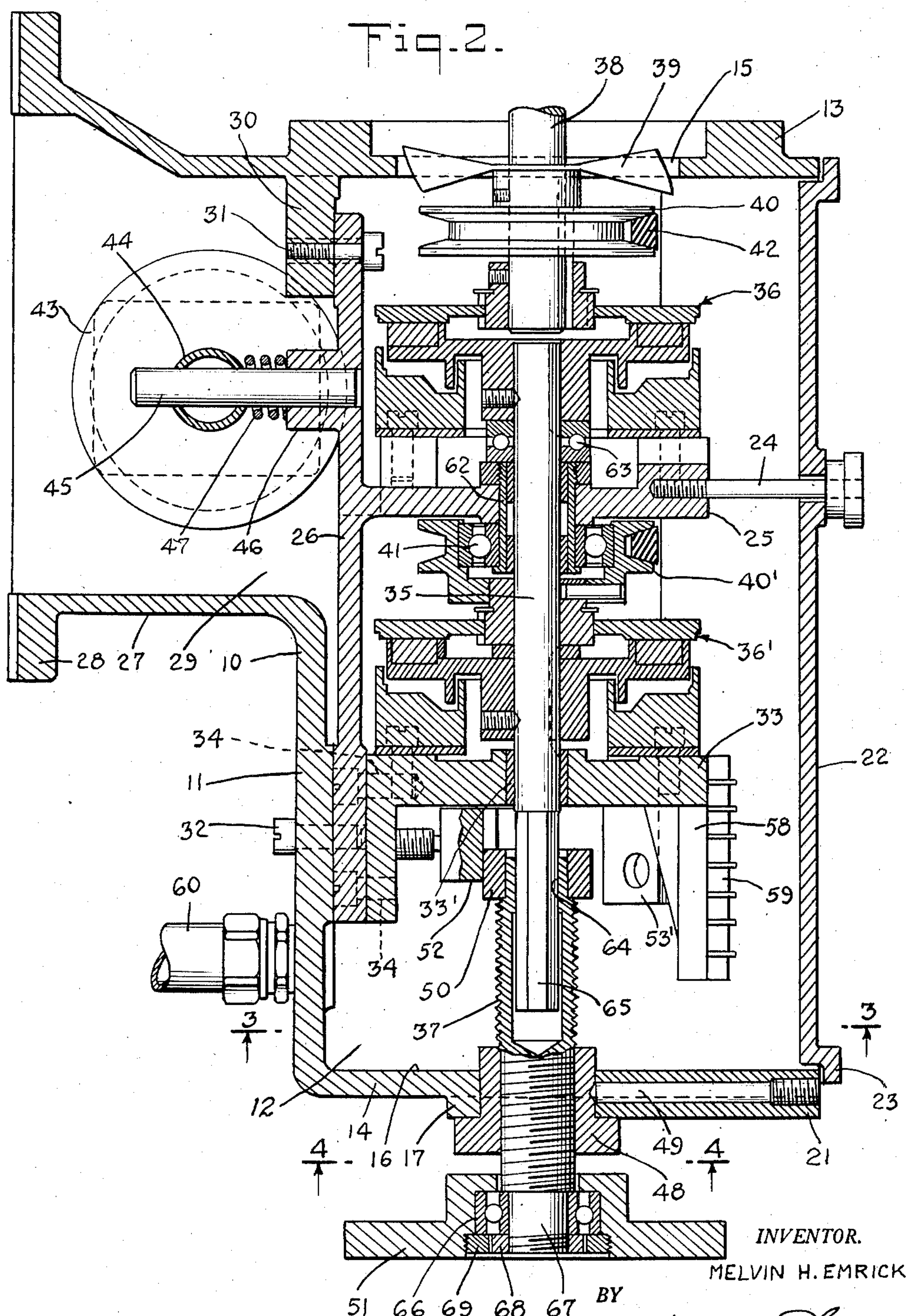
INVENTOR.
MELVIN H. EMRICK
BY
ATTORNEY.

LEAD SCREW TAPPING UNIT
Filed Sept. 28, 1954 3 Sheets-Sheet 3
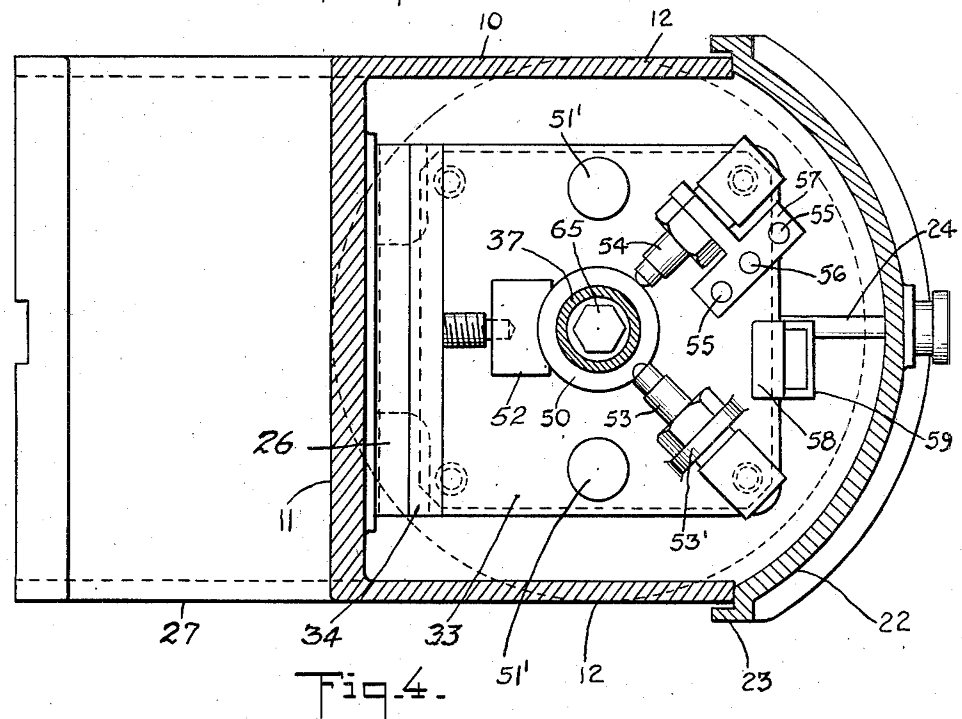
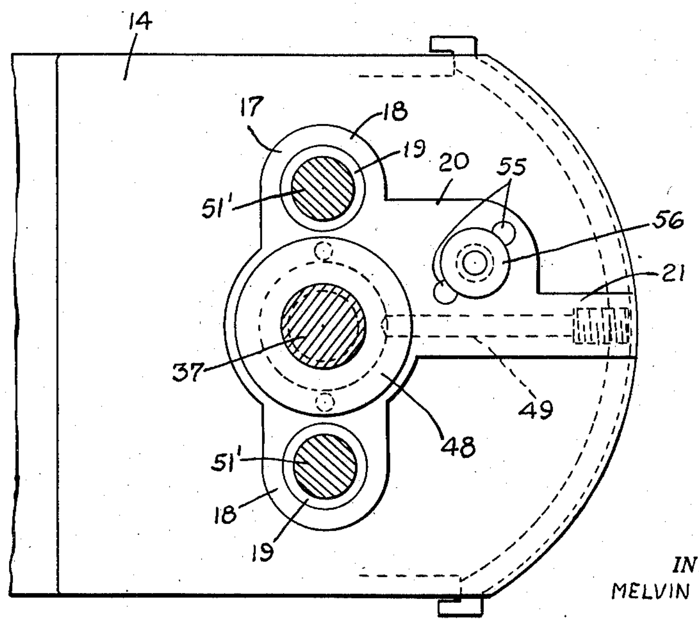
INVENTOR.
MELVIN H. EMRICK
BY
[signature]
ATTORNEY.

2,832,224

LEAD SCREW TAPPING UNIT

Melvin H. Emrick, Manhasset, N. Y.

Application September 28, 1954, Serial No. 458,879

8 Claims. (Cl. 74—57)

This invention relates to lead screw tapping units, generally of the type and kind disclosed in my prior Patent No. 2,729,834, issued January 10, 1956. More particularly, the invention deals with a unit of the character described, wherein the operative mechanism of the unit, as an assemblage, is readily attachable and detachable with respect to the casing of the unit in the repair thereof or removal of parts thereof.

Still more particularly, the invention deals with a unit of the character defined, wherein means is provided for adjustable support of one of the switches in the casing in control of depth of stroke in operation of the unit, said adjustable means being accessible externally of the casing and, still more particularly, the invention deals with an operating mechanism for units of the character described employing spaced bearings for the driven lead screw operating shaft, thereby maintaining alinement of the shaft and lead screw in the operation thereof.

The novel features of the invention will be best understood from the following description, when taken together with the accompanying drawing, in which certain embodiments of the invention are disclosed and, in which, the separate parts are designated by suitable reference characters in each of the views and, in which:

Fig. 2 is a longitudinal sectional view generally on the line 2—2 of Fig. 1, with parts of the construction shown in elevation and omitting part of the background showing.

Fig. 3 is a section substantially on the line 3—3 of Fig. 2, omitting part of the background showing; and Fig. 4 is a section on the line 4—4 of Fig. 2 omitting the background showing.

Figure 1:
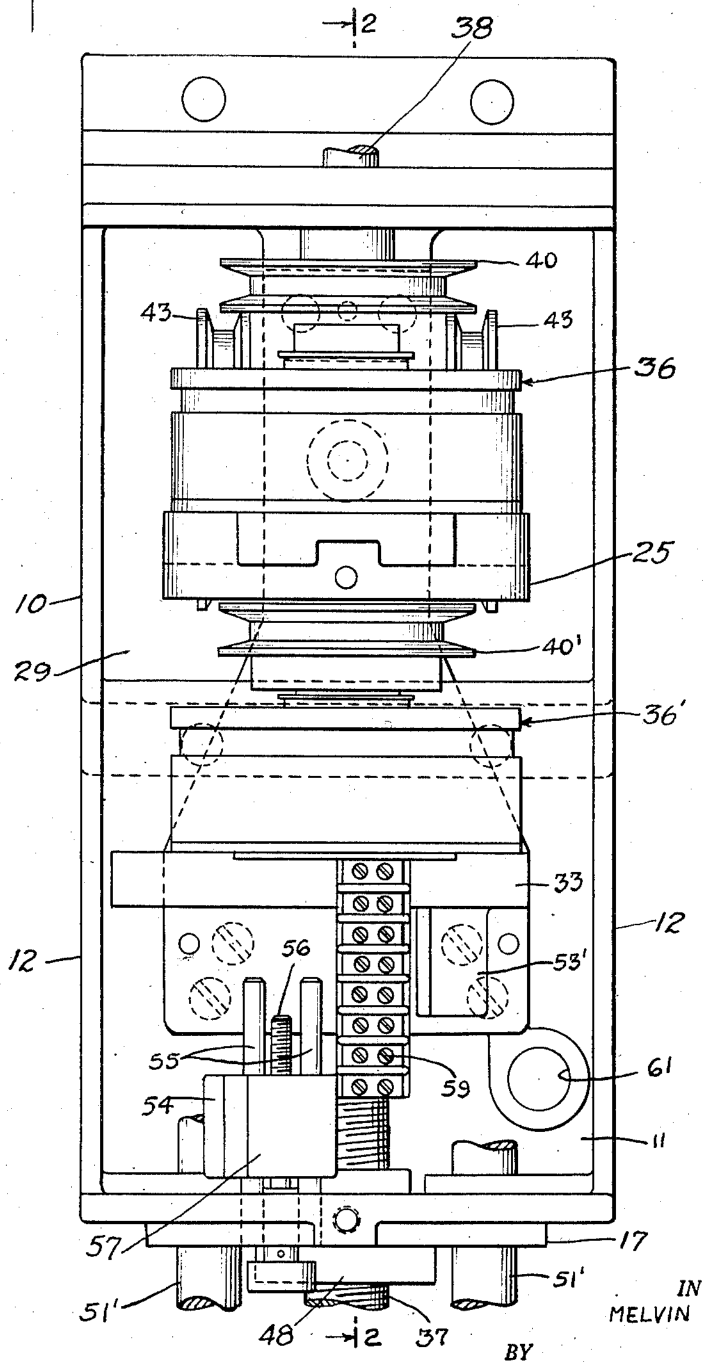
Fig. 1 is a face view of a unit made according to my invention, with the cover of the unit removed.

In lead screw tapping units of the character described, difficulty has been experienced in assemblage of the operative mechanism or apparatus of the unit with respect to the casing, resulting in considerable loss of time and relatively high costs by virtue of the time devoted to assemblage. Further, in the event of part replacement or repair again considerable expense was necessary in order to care therefor in disassembling the apparatus in the casing.

Still further, units of the kind under consideration have not been too practical from the standpoint of use, particularly in the control of feed of the lead screw with respect to the workpiece. To overcome these and other objectionable features, including the question of proper bearing support for the lead screw operating shaft, I have provided a unit, wherein the entire operative mechanism of the unit constitutes an assemblage which, as such, can be readily attached and detached with respect to the casing of the unit. It will, thus, be apparent that the building of the operative mechanism or apparatus by being fully exposed and accessible is materially simplified, as is also the care for repairs or removal of parts.

Another advantage of my improved operating apparatus is in providing a frame having longitudinally spaced bearings for the driven lead screw operating shaft, so as to maintain an assured alinement of this shaft and the lead screw in performing a tapping operation in the workpiece.

In addition to the foregoing, I also provide on the casing of the unit adjustable means readily accessible externally of the casing for controlling feed movement of the lead screw with respect to a workpiece, thereby materially expediting and more accurately performing the desired tapping operation.

In Fig. 2 of the accompanying drawing, I have shown, in section, the casing 10 of my improved unit. The main body portion of this casing is substantially U-shaped in cross-sectional form, as noted clearly in Fig. 3 of the drawing and is defined by a back wall 11, the side walls 12. The casing also includes top and bottom walls 13 and 14, as clearly noted in Fig. 2 of the drawing. The top wall has a large central opening 15; whereas, the bottom wall has a center smaller opening 16, around which is an enlargement 17, the enlargement being generally of the contour noted in Fig. 4 of the drawing to include two side bearing portions 18, in which are disclosed bearings 19 to receive two rods, not shown, the rods being utilized to support the casing to take up any torque to which the casing may be subjected.

The enlargement 17 also has an extension 20 with a reduced portion 21, the latter extending to the forward edge of the bottom wall, as noted in Fig. 2 of the drawing. The front of the casing 10 is open and this opening is closed by a quickly detachable cover 22, having grooved edge portions, as noted at 23 in Figs. 2 and 3 of the drawing to engage the forward edge of the side and top and bottom walls.

At 24 is shown a clamp screw for securing the cover 22 in position. The screw engages one bearing 25 of a frame 26 of the apparatus or operating mechanism of the unit. The upper portion of the rear wall 11 has an offset housing portion 27 with a flanged outer end 28 for mounting the casing in connection with a suitable part of a machine. The back wall 11 has a large opening 29, which registers with the chamber of the housing 27, the back wall including a large bracket portion 30 which extends into the opening 29 and forms a support for a screw 31 in mounting the frame 26 in the casing 10. Two other screws are employed to secure the lower portion of the frame 26 with the casing and one of these screws is indicated at 32 in Fig. 2 of the drawing.

At this time, it is well to point out that, when the cover 22 is removed and the lead screw, later described, is detached from the casing, by removing the screws 31 and 32, the entire operating mechanism of the unit can be removed through the front opening of the casing, it being understood in this connection that suitable coupling and uncoupling will be provided between the drive shaft and the means for actuating said shaft.

The frame, in addition to the integral bearing plate 25, also has a detachable bearing plate 33 secured to the frame 26 by screws, as indicated in dotted lines at 33 in Fig. 2 of the drawing. The bearing plate 33 has a plain bearing 33' for the driven shaft 35 of the operative mechanism of the unit. The shaft 35 is driven in forward and reverse directions by forward and reverse electric clutches 36, 36', generally of the type and kind disclosed in my prior application, hereinbefore noted. The forward drive clutch is adapted to operate the shaft 35 in the feed drive of a lead screw 37 into a workpiece; whereas, the clutch 36' operates the lead screw in the reverse direction in removing a tap from a workpiece.

At 38 is shown the drive shaft which can be driven directly from a motor or in any other desired manner and on this shaft, within the opening 15, is arranged a fan 39 for circulating air through the casing 10. Fixed to the shaft 38 is a main drive pulley 40, which constitutes one of a set of four pulleys utilized in the drive of the unit, another reverse drive pulley 40' being arranged upon a suitable bearing 41 on the shaft 35, as clearly noted in Fig. 2 of the drawing.

The single belt, which is indicated in part in section in Fig. 2 of the drawing, at 42, also passes around two other idler pulleys 43 arranged in the housing 27 on an axis 44. The axis 44 slidably engages a rod 45 mounted in connection with the frame 26, as seen at 46, and a spring 47 is employed to maintain tension upon the pulleys 43 to keep the belt 42 taut. In order to simplify the showing, the belt is omitted from Fig. 1 of the drawing and is only indicated in part in Fig. 2. However, as this drive is well known and shown in my prior application, no further detailed decription thereof will be given, nor to the detailed structure of the electric clutches 36, 36'.

The lead screw 37 operates in a threaded bushing or sleeve 48 fixed in the aperture 16 by a threaded pin 49 which is mounted in the enlargement 21, as clearly noted in Fig. 2 of the drawing.

Mounted upon the inner end of the lead screw 37 is a switch actuating collar 50, the diameter of which is such as to freely pass through the aperture 16 so that the lead screw, together with the collar and sleeve 48, can be readily removed from the casing 10 in substitution of different lead screw assemblages with the unit and, further, in removal of the frame 26 and the mechanism mounted thereon from the casing 10.

The lead screw 37 supports, at its outer end, an adaptor plate 51, with which a multiple tapping head can be coupled.

The plate 51 has rods 51', note Fig. 4, which operate in the bearings 19 and are movable in the lower portion of the casing 10.

Adjustably supported in the frame 26 is a backing shoe 52 for backing up the collar 50, particularly when the collar operatively engages the upper switch 53, which stops upward movement of the lead screw and automatically puts the mechanism at rest, preparatory to actuation of another switch for putting the mechanism into operation or, in other words, a switch for starting operation of the machine. This last named switch is not shown as it is quite common in all machines of the kind under consideration and, if my improved unit is used in a series of uninterrupted operations, in what might be termed an automatic operation, the switch 53 can automatically operate to put the forward drive clutch 36 into operation, while stopping the drive or operation of the reverse drive clutch 36'.

At 54 I have shown the lower switch which is adjustably supported on two guide rods 55 supported in the extension 20 of the bottom wall 14, as clearly noted in Fig. 4 of the drawing, an adjustment screw 56 being rotatably mounted in the bottom wall 14 and in threaded engagement with the block 57 of the switch 54 so as to forwardly move the switch 54 into positions longitudinally with respect to the lead screw 37. In this way, an extremely accurate positioning of the switch 54 can be provided, so as to accurately check downward feed movement of the screw 37 by engagement of the collar 50 with the switch 54; then automatically shutting off the forward drive clutch 36 and throwing the reverse drive clutch 35' into operation, resulting in the reverse feed of the screw 37 and this continues until the collar 50 strikes and operates the switch 53, for purposes as previously described.

The switch 53 has been omitted from Fig. 2 of the drawing for simplification of the drawing. However, the supporting plate 53' for said switch is indicated. This plate depends from the gearing plate 33, as clearly noted in Fig. 1 of the drawing. Also extending downwardly from the plate 33 is an arm 58, note Figs. 2 and 3, in connection with which a terminal post 59 of the electric wiring is coupled, this post being clearly seen in Fig. 1 of the drawing.

The circuit wires and circuits to the various switches and various parts of the unit are not disclosed, as they form no direct part of the present invention and are generally known in the trade. The wires will pass into the casing 10 through the tubing 60 and aperture 61 in the back wall 11 of the casing, the aperture being noted in Fig. 1 of the drawing.

It will appear from a consideration of Fig. 2 that the shaft 35 has a plain bearing 62 in the bearing plate 25 and above the bearing 62 is a roller thrust bearing 63 taking up the load, particularly in the direction or feed drive of the screw 37.

The inner end portion of the lead screw 37 has an angular bore 64 of hexagon or other cross-sectional form, in conjunction with which the lower angular or hexagon end 65 of the drive shaft 35 operates. This provides a long and strong and durable key coupling of the lead screw with the shaft 35, as will be apparent.

The plate 51 has a ball bearing mounting, as at 66, on the reduced end 67 of the lead screw, note Fig. 2. The bearing 66 is held in position on the reduced end 67 by a sleeve nut 68 in threaded engagement with the end 67; whereas, the bearing 66 is supported in the plate 51 by another threaded sleeve 69 in threaded engagement with the plate. It will, thus, be seen that the lead screw is free to rotate in the plate 51 and, at the same time, the plate 51 moves upwardly and downwardly, together with the screw, the plate being held against rotation by the rods 51'.

Having fully described my invention, what I claim as new and desire to secure by Letters Patent is:

1. A lead screw tapping unit, comprising a casing, defined by top, bottom, back and side walls, the entire front of the casing being open, the back wall of the casing having a projecting housing opening into the upper portion of the casing, a lead screw drive mechanism detachable with said casing through the front opening, said mechanism comprising a frame mounted on the rear wall of the casing and having an integral bearing plate intermediate upper and lower ends thereof, another bearing plate detachably mounted on the lower portion of the frame, said plate forming bearing supports for a driven shaft arranged vertically in the casing, a drive shaft extending into the upper end of the casing and directly coupled with a forward drive electric clutch, a reverse drive electric clutch arranged below said first named bearing plate, a pulley on the drive shaft, another pulley coupled with the reverse drive clutch, a pair of pulleys yieldably mounted upon said frame and disposed within said housing, a single belt operatively engaging all of the pulleys in control of the forward and reverse drive of said driven shaft through actuation of said clutches, a lead screw rotatably and detachably mounted in the bottom wall of the casing and extending outwardly of said bottom wall, means providing an elongated key drive between the driven shaft and said lead screw, a switch mounted on the second named bearing plate stopping drive of the reverse drive electric clutch, another switch adjustably mounted on the bottom wall of the casing for actuating said reverse drive electric clutch, said switch being in circuit with the forward and reverse drive clutches, and a switch actuating collar on said lead screw operatively engaging said switches in automatically controlling forward and reverse drives of the lead screw through said clutches.

2. In lead screw tapping units of the character described, employing a casing having a large opening in one side thereof, a lead screw detachably mounted in one wall of the casing and having an outer end projecting from the casing, an operating mechanism comprising a driven shaft, with means providing an elongated key drive of the driven shaft with said lead screw, said mechanism including means for actuating the driven shaft in forward and reverse directions, and means comprising a frame on which said mechanism is supported for detachably mounting the mechanism as an assemblage with respect to said casing through said large opening.

3. In lead screw tapping units of the character described, employing a casing having a large opening in one side thereof, a lead screw detachably mounted in one wall of the casing and having an outer end projecting from the casing, an operating mechanism comprising a driven shaft, with means providing an elongated key drive of the driven shaft with said lead screw, said mechanism including means for actuating the driven shaft in forward and reverse directions, means comprising a frame on which said mechanism is supported for detachably mounting the mechanism as an assemblage with respect to said casing through said large opening, said lead screw including switch actuating means, and a pair of switches controlling operation of said forward and reverse driving means, said switches being arranged in the path of movement of said switch actuating means for automatically controlling forward and reverse feed of the lead screw.

4. In lead screw tapping units of the character described, employing a casing having a large opening in one side thereof, a lead screw detachably mounted in one wall of the casing and having an outer end projecting from the casing, an operating mechanism comprising a driven shaft, with means providing an elongated key drive of the driven shaft with said lead screw, said mechanism including means for actuating the driven shaft in forward and reverse directions, means comprising a frame on which said mechanism is supported for detachably mounting the mechanism as an assemblage with respect to said casing through said large opening, said lead screw including switch actuating means, a pair of switches controlling operation of said forward and reverse driving means, said switches being arranged in the path of movement of said switch actuating means for automatically controlling forward and reverse feed of the lead screw, and one of said switches being adjustably supported in the casing to control and regulate forward feed of the lead screw.

5. In lead screw tapping units of the character described, employing a casing having a large opening in one side thereof, a lead screw detachably mounted in one wall of the casing and having an outer end projecting from the casing, an operating mechanism comprising a driven shaft, with means providing an elongated key drive of the driven shaft with said lead screw, said mechanism including means for actuating the driven shaft in forward and reverse directions, means comprising a frame on which said mechanism is supported for detachably mounting the mechanism as an assemblage with respect to said casing through said large opening, said lead screw including switch actuating means, a pair of switches controlling operation of said forward and reverse driving means, said switches being arranged in the path of movement of said switches actuating means for automatically controlling forward and reverse feed of the lead screw, one of said switches being adjustably supported in the casing to control and regulate forward feed of the lead screw, an adaptor plate rotatably mounted on the lead screw outwardly of said casing, a drive shaft extending into the casing and coupled with the means for actuating the lead screw in forward and reverse directions, and a fan mounted on said drive shaft in said end of the casing.

6. In lead screw tapping units of the character described, employing a casing having a large opening in one side thereof, a lead screw detachably mounted in one wall of the casing and having an outer end projecting from the casing, an operating mechanism comprising a driven shaft, with means providing an elongated key drive of the driven shaft with said lead screw, said mechanism including means for actuating the driven shaft in forward and reverse directions, means comprising a frame on which said mechanism is supported for detachably mounting the mechanism as an assemblage with respect to said casing through said large opening, and said frame having spaced bearing plates positioned longitudinally of and forming bearing supports for said driven shaft.

7. In lead screw tapping units of the character described, employing a casing having a large opening in one side thereof, a lead screw detachably mounted in one wall of the casing and having an outer end projecting from the casing, an adaptor plate rotatably mounted on the outer end of said lead screw, an operating mechanism comprising a driven shaft, with means providing an elongated key drive of the driven shaft with said lead screw, said mechanism including means for actuating the driven shaft in forward and reverse directions, and means comprising a frame on which said mechanism is supported for detachably mounting the mechanism as an assemblage with respect to said casing through said large opening.

8. In a lead screw tapping unit of the character described, comprising a casing, a lead screw detachably mounted in one wall of the casing, a switch adjustably mounted in said wall of the casing adjacent the lead screw, with means externally of the casing for adjusting said switch, an operating mechanism comprising a driven shaft detachably mounted as an assemblage with respect to said casing, said driven shaft having a key coupling with said lead screw, means on the lead screw operatively engaging said switch in checking outward feed drive of the lead screw with respect to said casing, and another switch mounted on and constituting part of said mechanism for checking inward movement of the lead screw with respect to said casing.

References Cited in the file of this patent

UNITED STATES PATENTS

| | | |
|---|---|---|
| 2,247,562 | Santen | July 1, 1941 |
| 2,414,515 | Field | Jan. 21, 1947 |
| 2,501,738 | Prutton | Mar. 28, 1950 |
| 2,551,936 | Funk | May 8, 1951 |
| 2,553,826 | Martin | May 22, 1951 |
| 2,600,022 | Prutton | June 10, 1952 |